United States Patent
Upp et al.

(10) Patent No.: US 10,039,151 B1
(45) Date of Patent: Jul. 31, 2018

(54) METHODS AND SYSTEMS FOR CONNECTING A WIRELESS COMMUNICATIONS DEVICE TO A DEPLOYABLE WIRELESS COMMUNICATIONS NETWORK

(71) Applicant: MOTOROLA SOLUTIONS, INC., Chicago, IL (US)

(72) Inventors: Steven D. Upp, Bartlett, IL (US); Anthony R. Metke, Naperville, IL (US); Karen M. Upp, Bartlett, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/422,177

(22) Filed: Feb. 1, 2017

(51) Int. Cl.
*H04W 4/00* (2018.01)
*H04W 76/19* (2018.01)
(Continued)

(52) U.S. Cl.
CPC .............. *H04W 76/19* (2018.02); *H04W 8/20* (2013.01); *H04W 12/06* (2013.01); *H04W 76/028* (2013.01)

(58) Field of Classification Search
CPC ..................................................... H04W 76/19
(Continued)

(56) References Cited

U.S. PATENT DOCUMENTS 7,284,042 B2 * 10/2007 Beadles ................... H04L 29/06
709/201
8,699,709 B2    4/2014 Thomas et al.
(Continued)

FOREIGN PATENT DOCUMENTS

EP    1699166    9/2006

OTHER PUBLICATIONS

3GPP TSG CT Meeting #69, "3Release 13 analytical view version Sep. 9, 2015," technical specification, Sep. 14-15, 2015, 889 pages, RP-151569.
(Continued)

*Primary Examiner* — Samina Choudhry
(74) *Attorney, Agent, or Firm* — Michael Best & Friedrich LLP

(57) ABSTRACT

Methods and systems for connecting a wireless communications device to a deployable wireless communications network. The method includes receiving, from the wireless communications device via a mobile management entity (MME) configured to operate as an extensible authentication protocol (EAP) authenticator, an extensible authentication protocol packet. The method further includes authenticating the wireless communications device based on the extensible authentication protocol packet. The method further includes establishing a first wireless connection between the wireless communications device and a deployable subscription bootstrapping service of the deployable wireless communications network. The method further includes generating a subscription profile for the wireless communications device, and communicating the subscription profile to the wireless communications device via the first wireless connection. The method further includes discontinuing the first wireless connection, and establishing a second wireless connection between the wireless communications device and the deployable wireless communications network using the subscription profile.

14 Claims, 3 Drawing Sheets

(51) Int. Cl.
*H04W 76/02* (2009.01)
*H04W 8/20* (2009.01)
*H04W 12/06* (2009.01)

(58) Field of Classification Search
USPC ......................................................... 370/329
See application file for complete search history.

(56) References Cited

U.S. PATENT DOCUMENTS

| | | |
|---|---|---|
| 8,929,862 B2 | 1/2015 | Popovich et al. |
| 9,398,452 B1 | 7/2016 | Upp et al. |
| 2008/0313450 A1 | 12/2008 | Rosenberg |
| 2013/0157673 A1 | 6/2013 | Brusilovsky |
| 2014/0315535 A1* | 10/2014 | Bajko ..................... H04W 8/20 455/419 |
| 2016/0087972 A1 | 3/2016 | Ahmavaara et al. |
| 2016/0316409 A1 | 10/2016 | Upp et al. |

OTHER PUBLICATIONS

Office Action from the U.S. Appl. No. 14/695,239 dated Apr. 1, 2016 (9 pages).
PCT/US2018/012543 International Search Report and Written Opinion of the International Searching Authority dated Mar. 9, 2018 (16 pages).
Anonymous, "LTE Architecture: LTE system architecture basics: tutorials", (Dec. 8, 2016), XP055455085, Retrieved from the Internet: URL:https://web.archive.org/web/2016120804 3324/http://www.rfwireless-orld.com/Tutor ials/LTE-tutorial.html [retrieved on Feb. 28, 2018].

* cited by examiner

US 10,039,151 B1

METHODS AND SYSTEMS FOR CONNECTING A WIRELESS COMMUNICATIONS DEVICE TO A DEPLOYABLE WIRELESS COMMUNICATIONS NETWORK

BACKGROUND OF THE INVENTION

Public safety agencies responding to an incident (for example, a building fire, a criminal pursuit or other law enforcement activity, a natural disaster, a medical incident, a traffic accident, and the like) may coordinate response efforts using wireless communications devices. The wireless communications devices communicate data, video, voice, and other traffic through one or more network sub-systems (for example, a Long Term Evolution (LTE) wireless network) providing communications coverage at or near the area of the incident. In some areas, there is no fixed network service that provides a secure data network for public safety use (for example, rural areas, wilderness areas, or areas where catastrophic events have disabled pre-existing networks).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
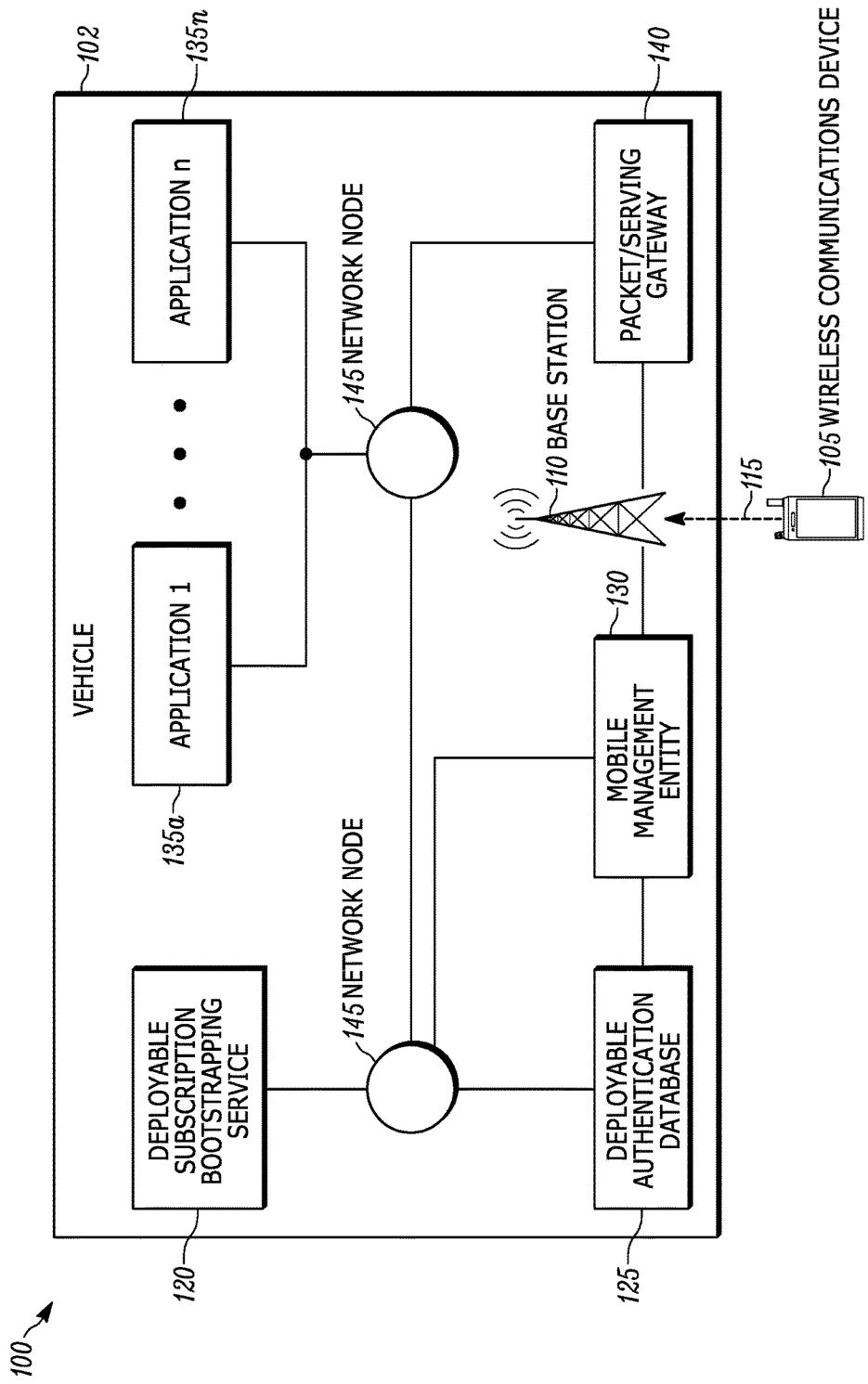
FIG. 1 is a diagram of deployable wireless communications network according to one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When public safety agencies respond to incidents in environments where there is no fixed network service, deployable wireless communications networks may be used to establish or re-establish secure data networks for public safety use. A deployable wireless communications network can include components of a radio access network (RAN), an evolved packet core (EPC), and packet data networks (PDNs) that contain applications and services utilized by the wireless devices.

Existing network authentication methods (for example, authentication and key agreement (AKA) authentication) use shared symmetric keys (for example, Ki) and require access to a home subscriber server (HSS) for authentication. The wireless devices store their shared symmetric keys on a physically secured universal integrated circuit card (UICC). The shared symmetric key is also stored at, and is associated with, a home subscriber server. At an incident scene or remote location where there is no fixed network service, there are few, if any, options for connecting visiting wireless devices with their corresponding home subscriber servers to authenticate these visiting wireless devices. In order to provide remotely operable wireless data communications networks, the deployable wireless data communications networks have their own local home subscriber servers. In order to support isolated, securely-authenticated service operation, sensitive security information for each wireless device (for example, a shared symmetric key) from multiple remote home subscriber server databases could be replicated on the local home subscriber server. However, in some cases, it may not be possible to acquire this data, and duplicating the data may pose security risks. Therefore, existing authentication methods are not practical where users from multiple agencies require their wireless devices to access the same deployable wireless data communications network.

One technique for addressing these deficiencies includes implementing an auxiliary network within a deployable wireless communications network. However, the systems and method described herein, among other features, allow for wireless devices of users from multiple agencies to connect to the deployable wireless communications network without using an auxiliary network in a location where the deployable wireless communications network is unable to communicate with the home subscriber server associated with the wireless devices.

One embodiment provides a method for connecting a wireless communications device to a deployable wireless communications network. The deployable wireless communications network includes a local authentication database. The method includes receiving, from the wireless communications device via a mobile management entity (MME) configured to operate as an extensible authentication protocol (EAP) authenticator, an extensible authentication protocol packet. The method further includes authenticating, via a communication between the mobile management entity and the local authentication database, the wireless communications device based on the extensible authentication protocol packet. The method further includes establishing a first wireless connection between the wireless communications device and a deployable subscription bootstrapping service of the deployable wireless communications network. The method further includes determining, via the deployable subscription bootstrapping service, a shared symmetric key based on the extensible authentication protocol packet. The method further includes generating, via the deployable subscription bootstrapping service, a subscription profile including the shared symmetric key. The method further includes communicating, via the deployable subscription bootstrapping service, the subscription profile to the wireless communications device via the first wireless connection. The method further includes discontinuing the first wireless connection, and establishing a second wireless connection between the wireless communications device and the deployable wireless communications network using the subscription profile.

Another embodiment provides a deployable wireless communications network including a base station configured to communicate with a wireless communications device. The deployable wireless communications network further includes a mobile management entity (MME) configured to operate as an extensible authentication protocol (EAP) authenticator. The mobile management entity receives an extensible authentication protocol packet from the wireless communications device. The deployable wireless communications network further includes a local authentication database configured to communicate with the mobile management entity to authenticate the wireless communications device based on the extensible authentication protocol packet. The deployable wireless communications network further includes a deployable subscription bootstrapping service configured to communicate with the wireless communications device over a first wireless connection. The deployable subscription bootstrapping service determines a shared symmetric key based on the extensible authentication protocol packet, and generates a subscription profile including the shared symmetric key. The deployable subscription bootstrapping service also communicates the subscription profile to the wireless communications device via the first wireless connection. The deployable wireless communications network then discontinues the first wireless connection, and establishes a second wireless connection between the wireless communications device and the deployable wireless communications network using the subscription profile.

FIG. 1 illustrates an example deployable wireless communications network 100, which operates according to the Long Term Evolution (LTE) specification. In other embodiments, the deployable wireless communications network 100 operates using other specifications or protocols. Components of the deployable wireless communications network 100 are, in one embodiment, configured to be mounted on a vehicle 102 (illustrated schematically), or another means for transporting and deploying the deployable wireless communications network 100.

As shown in the example of FIG. 1, a wireless communications device 105 communicates with the deployable wireless communications network 100 through a base station 110 such as an Evolved Node B (eNodeB) as explained in greater detail below. Although only one wireless communications device 105 is shown in FIG. 1, in some embodiments, multiple wireless communications devices 105 use the deployable wireless communications network 100. For example, a first wireless communications device may communicate with a second wireless communications device through the deployable wireless communications network 100. As illustrated in FIG. 1, each wireless communications device 105 may be a handheld communication device for example, a smart telephone, tablet, personal digital assistant (PDA), smart watch or other smart wearable device, drone, or other device that includes or can be connected to a network modem or components to enable wireless network communications (such as a baseband processor, memory, amplifier, antenna, and the like). Each wireless communications device 105 is designed to communicate wirelessly with the base station 110 over a wireless communication link 115 (for example, by sending and receiving radio signals). In some embodiments, the deployable wireless communications network 100 provides Long Term Evolution cellular service to wireless communications devices 105 within a limited area (for example, within wireless communication range of the base station 110).

In the example illustrated, the deployable wireless communications network 100 includes a deployable subscription bootstrapping service 120 and a deployable authentication database 125 (in other words, a local authentication database). In some embodiments, the deployable authentication database 125 may be implemented more particularly as a deployable (or local) home subscriber server (HSS). The deployable authentication database 125 stores subscription profiles for wireless communications devices 105 and performs authentication functions for the deployable wireless communications network 100. The deployable subscription bootstrapping service 120 creates subscription profiles for wireless communications devices 105 and communicates with the deployable authentication database 125 and the wireless communications device 105 as explained in greater detail below.

The deployable wireless communications network 100 also includes a mobile management entity 130, one or more applications 135a and 135n, and a packet/serving gateway 140. In some embodiments, the mobile management entity 130 authenticates wireless communications devices 105 that attempt to communicate over the deployable wireless communications network 100 or that attempt to gain access to the components of the deployable wireless communications network 100 (for example, the applications 135a and 135n). For example, the mobile management entity 130 may authenticate wireless communications devices 105 by communicating with the deployable authentication database 125. For example, when possible, the mobile management entity 130 may compare a shared symmetric key received from the wireless communications device 105 with a shared symmetric key that is stored at, and is associated with, a remotely-located home subscriber server. After authentication, the mobile management entity 130 assigns the authenticated wireless communications device 105 an access point name (APN) and a packet/serving gateway (for example, the packet/serving gateway 140). The mobile management entity 130 communicates information related to the authenticated wireless communications device 105 and its corresponding access point name to the assigned packet/serving gateway 140. The packet/serving gateway 140 then receives network packets from wireless communications device 105 through the base station 110. Based on the access point name of the wireless communications device 105, the packet/serving gateway 140 routes the received network packets. In other words, the packet/serving gateway 140 may prevent or allow the wireless communications device 105 to communicate with various components of the deployable wireless communications network 100 (for example, the applications 135a and 135n) based on information received from the mobile management entity 130.

As shown in FIG. 1, the components of the deployable wireless communications network 100 may be connected by network nodes 145. In some embodiments, components of the deployable wireless communications network 100, for example the base station 110, may be removable from the vehicle 102. In some embodiments, the deployable wireless communications network 100 may include fewer or additional components. For example, although FIG. 1 illustrates two applications 135a and 135n, in some embodiments the deployable wireless communications network 100 includes additional applications.

Figure 2:
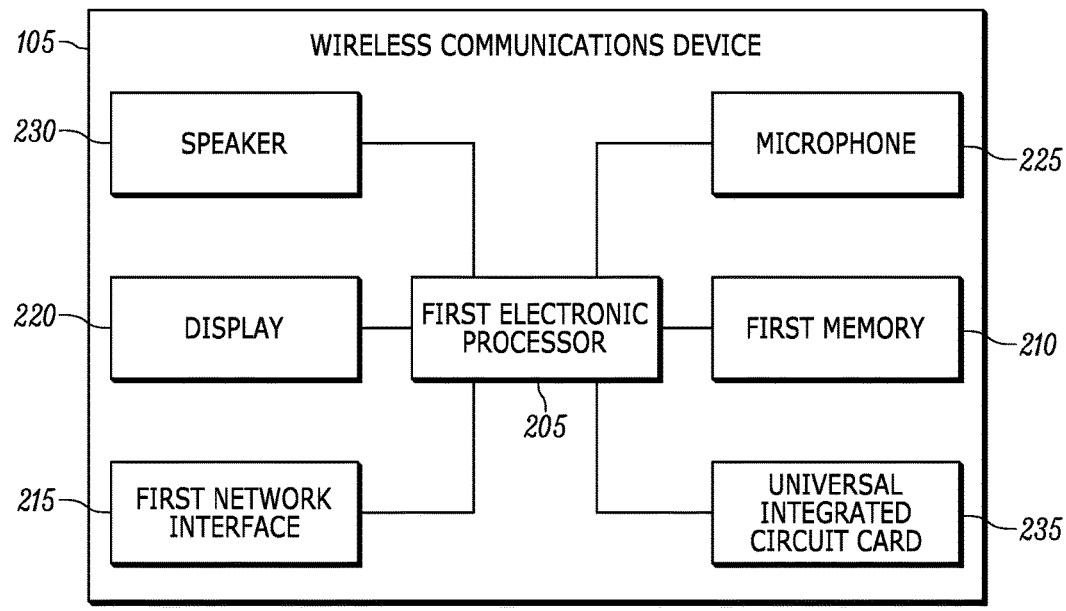
FIG. 2 is a diagram of a wireless communications device that communicates with the deployable wireless communications network of FIG. 1 according to one embodiment.

FIG. 2 is a diagram of the wireless communications device 105 of FIG. 1 according to one embodiment. The wireless communications device 105 includes a first electronic processor 205 (for example, a microprocessor or another electronic device). The first electronic processor 205 may include input and output interfaces (not shown) and be electrically coupled to a first memory 210, a first network interface 215, a display 220, a microphone 225, and a speaker 230. The wireless communications device 105 may also include a universal integrated circuit card (UICC) 235. In some embodiments, the wireless communications device 105 may include fewer or additional components in configurations different from that illustrated in FIG. 2. For example, in some embodiments, the wireless communications device 105 also includes a camera and a location component (for example, a global positioning system receiver). In some embodiments, the wireless communications device 105 performs additional functionality than the functionality described below.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 sends and receives data to and from the base station 110. For example, the first network interface 215 may include a radio transceiver for wirelessly communicating with the base station 110 (for example, using radio signals). Alternatively or in addition, the first network interface 215 may include a connector or port for receiving a wired connection to the base station 110, such as an Ethernet cable. The first electronic processor 205 receives electrical signals representing sound from the microphone 225 and may communicate information relating to the electrical signals to the base station 110 through the first network interface 215, such as for receipt by another wireless communications device 105. Similarly, the first electronic processor 205 may output data received from the base station 110 or another device through the first network interface 215 to an output device of the wireless communications device 105 such as the speaker 230, the display 220, or a combination thereof. Throughout this description, when the wireless communications device 105 is described as transmitting or receiving data, the first network interface 215 is the component that is performing this transmitting and receiving.

The universal integrated circuit card 235 (in other words, the subscriber identity module (SIM)) is another type of memory that may be similar to the first memory 210 described previously herein. In some embodiments, the universal integrated circuit card 235 is removable from the wireless communications device 105. In other embodiments, functions performed by the universal integrated circuit card 235 are implemented in software in the first memory 210. In some embodiments, the universal integrated circuit card 235 is a non-volatile memory that stores a subscription profile (in other words, authentication data and network profile data) of the wireless communications device 105.

In some embodiments, the wireless communications device 105 includes a deployable subscription bootstrapping client (DSBC) that is configured to communicate and exchange information with the deployable subscription bootstrapping service 120 of the deployable wireless communications network 100 as described in greater detail below. In some embodiments, the deployable subscription bootstrapping client is a software application (in other words, an "app") stored in the first memory 210 of the wireless communications device 105, and executed by the first electronic processor 205 of the wireless communications device 105. In other embodiments, the deployable subscription bootstrapping client is built into an operating system of the wireless communications device 105. The deployable subscription bootstrapping client interacts with and controls aspects of the operating system and a network stack of the wireless communications device 105 to facilitate connection of the wireless communications device 105 to the deployable wireless communications network 100. In some embodiments, the deployable subscription bootstrapping client is configured to access and modify data on the first memory 210 of the wireless communications device 105 to, among other things, store and retrieve a subscription profile from the deployable subscription bootstrapping service 120.

The subscription profile may be transmitted to the mobile management entity 130 to allow the wireless communications device 105 to be authenticated when attempting to connect to the deployable wireless communications network 100. The subscription profile includes credentials, parameters, and settings that the wireless communications device 105 uses to establish a connection with the deployable wireless communications network 100 and the services provided by the applications 135a, 135n. For example, the subscription profile may include a shared symmetric key unique to the wireless communications device 105 and the deployable wireless communications network 100, a public land mobile network identification (PLMN ID), an access point name (APN), an international subscriber module identity (IMSI), and operator authentication keys (OPc). The subscription profile may also include temporary user certificates or temporary identity tokens that allow the wireless communications device 105 to access the services provided by the applications 135a, 135n.

Figure 3:
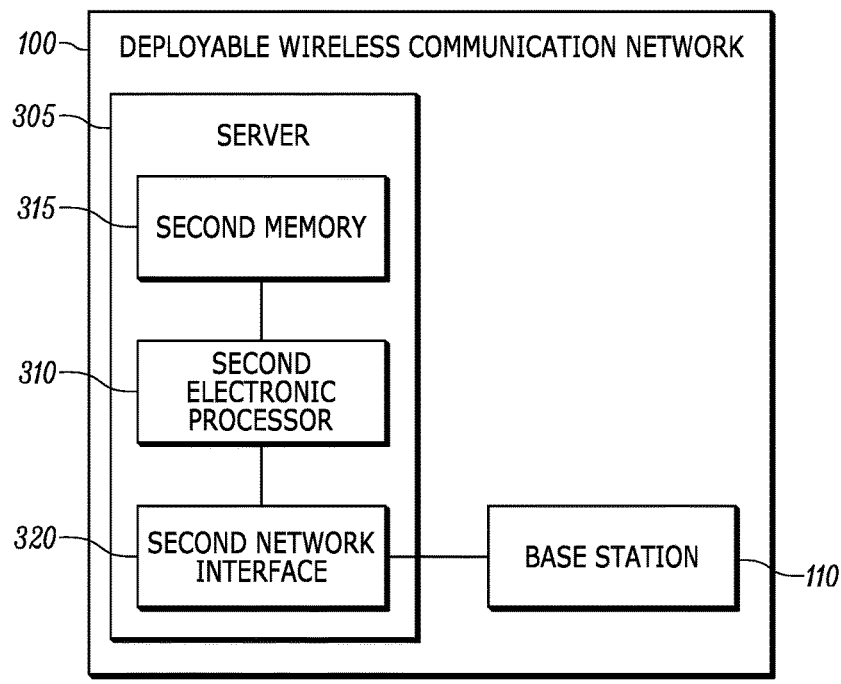
FIG. 3 is a diagram of the physical devices of the deployable wireless communications network of FIG. 1 according to one embodiment.

FIG. 3 is a diagram of the physical devices of the deployable wireless communications network 100 according to one embodiment. As shown in FIG. 3, in some embodiments, the components of the deployable wireless communications network 100 shown in FIG. 1 may be implemented on a server 305 (for example, a computer) that includes a second electronic processor 310, a second memory 315, and a second network interface 320. These components are similar to those described above with respect to the wireless communications device 105 and perform similar functions.

The second electronic processor 310 controls the second network interface 320 to send and receive data (for example, network packets) within or outside of the deployable wireless communications network 100. For example, the second network interface 320 is coupled to the base station 110 to wirelessly couple the mobile management entity 130, the wireless communications device 105, and other components of the deployable wireless communications network 100. Alternatively, or in addition, the second network interface 320 may include a connector or port for receiving a wired connection (for example, Ethernet) to the deployable wireless communications network 100. Although FIG. 3 shows the server 305 coupled via a wired connection to the base station 110, in some embodiments, the server 305 is coupled to the base station 110 through a wireless connection or a combination of wired and wireless connections. As mentioned previously herein, FIG. 3 is representative of the type of physical devices that may implement the components of the deployable wireless communications network 100 shown in FIG. 1. In some embodiments, the deployable wireless communications network 100 may include additional or fewer components. For example, the components of the deployable wireless communications network 100 shown in FIG. 1 may be implemented using multiple electronic processors or multiple servers. Throughout this description, when the network 100, the mobile management entity 130, or any other components of the network 100 are described as transmitting data to or receiving data from the wireless communications device 105, the base station 110 and the second network interface 320 are the components that are performing this transmitting and receiving.

As mentioned previously herein, deployable wireless communications networks (such as the network 100) are often used in areas where there is no fixed network service that provides a secure data network for public safety use (for example, rural areas, wilderness areas, or areas where catastrophic events have disabled pre-existing networks). When used in such areas, the mobile management entity 130 of the deployable wireless communications network 100 may not be able to communicate with remotely-located home subscriber servers of wireless communications devices 105 attempting to utilize resources of the network 100 (in other words, wireless communications devices of users from multiple agencies). Accordingly, the mobile management entity 130 may not be able to access the corresponding shared symmetric key of the wireless communications devices 105 to authenticate the wireless communications devices 105 and allow the wireless communications devices 105 to access the network 100.

However, the network 100 includes a modified mobile management entity 130 that operates as an extensible authentication protocol (EAP) authenticator and a modified deployable authentication database 125 (in other words, a local authentication database or a local home subscriber server) that operates as an extensible authentication protocol server. These modified components allow for the wireless communications device 105 to connect to the network 100 in a location where the network 100 is unable to communicate with the home subscriber server associated with the wireless communications device 105. In other words, the deployable wireless communications network 100 implements extensible authentication protocol authentication on a Long Term Evolution network to bootstrap secure wireless connections between the wireless communications device 105 and the network 100.

Figure 4:
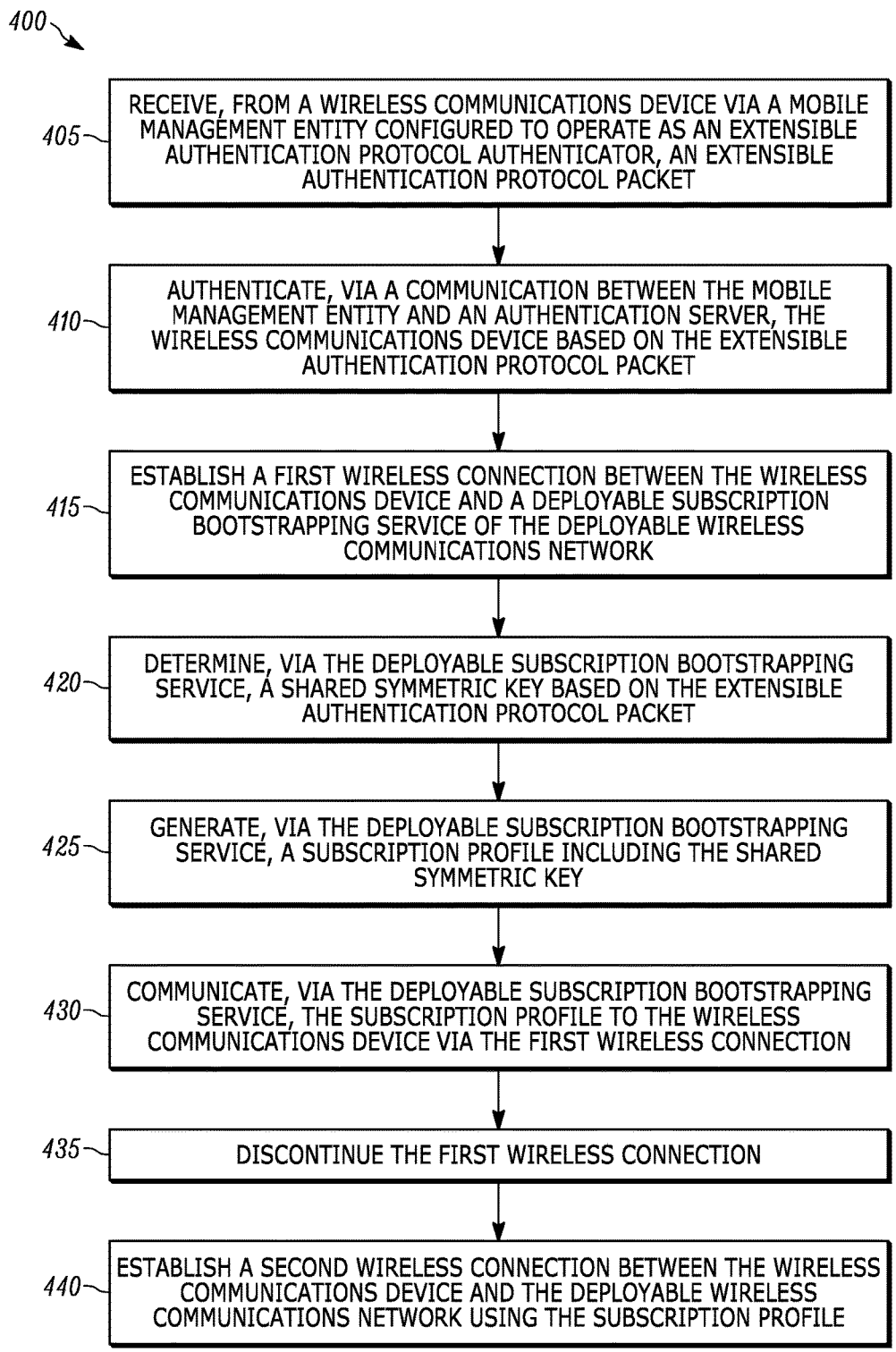
FIG. 4 is a flowchart of a method for connecting the wireless communications device of FIG. 2 to the deployable wireless communications network of FIG. 1 according to one embodiment.

FIG. 4 illustrates an example method 400 for connecting the wireless communications device 105 to the deployable wireless communications network 100 without communicating with the home subscriber server associated with the wireless communications device 105. In some embodiments, the method 400 is executed by the first electronic processor 205 and the second electronic processor 310 when the first electronic processor 205 recognizes that the network 100 has been deployed (for example, by receiving radio signals from the base station 110). For example, in such embodiments, the network 100 may determine that it is a deployable network without access to network infrastructure that allows the network 100 to access remotely-located home subscriber servers. In some embodiments, a non-deployable network may lose connectivity to the network infrastructure and may operate as a deployable network (in other words, in interrupted operations for public safety (IOPS) mode) until connectivity to the network infrastructure is restored. In either example, the network may communicate (in other words, advertise) through the base station 110 to wireless communications devices 105 that the network is a deployable wireless communications network 100 or is operating in interrupted operations for public safety mode (in other words, operating as a deployable wireless communications network 100). In other words, the network may communicate to wireless communications devices 105 that it is available before a first connection is established between a wireless communications device 105 and the deployable subscription bootstrapping service 120 as explained in greater detail below. In some embodiments, the deployable wireless communications network 100 may advertise that the deployable subscription bootstrapping service 120 is available that will allow wireless communications devices 105 to connect to the network 100 according to the Long Term Evolution specification.

At block 405, the mobile management entity 130 receives an extensible authentication protocol packet from the wireless communications device 105. While traditional mobile management entities according to the Long Term Evolution specification are not configured to operate as extensible authentication protocol authenticators, the mobile management entity 130 of the network 100 is configured to operate as an extensible authentication protocol authenticator. For example, the mobile management entity 130 may be modified to be able to receive extensible authentication protocol packets that are, for example, appended to the network packets transmitted by the wireless communications device 105 to the base station 110. In some embodiments, the wireless communications device 105 transmits the extensible authentication protocol packet to the mobile management entity 130 to supply its extensible authentication protocol master secret key (in other words, a digital authentication certificate) that may be stored on the first memory 210. In some embodiments, the extensible authentication protocol authentication method used is one of extensible authentication protocol pre-shared key (EAP-PSK), extensible authentication protocol transport layer security (EAP-TLS), and future-developed extensible authentication protocol authentication methods.

In some embodiments, the wireless communications device 105 supplies a different security credential to the mobile management entity 130 according to a different authentication protocol. For example, the security credential may be a passphrase or an identity token (ID) (for example, a security assertion markup language (SAML) token or an open authorization token (OAuth token) provided by a trusted authority). In some embodiments, the security credential contains attributes that determine what services or applications (for example, the applications 135a and 135n present on the deployable wireless communications network 100) can be accessed by the wireless communications device 105. The attributes of the security credential may also provide other information to be included in the subscription profile for the wireless communications device 105 (for example, which groups the wireless communications device 105 has access to when implementing a mission critical push-to-talk (MCPTT) operation).

Because the mobile management entity 130 is configured to operate as an extensible authentication protocol authenticator, at block 410, the mobile management entity 130 authenticates the wireless communications device 105 by communicating with the deployable authentication database 125. For example, the mobile management entity 130 compares the extensible authentication protocol master secret key from the wireless communications device 105 with a corresponding extensible authentication protocol master secret key stored in the deployable authentication database 125. Accordingly, the deployable authentication database 125 is configured to operate as an extensible authentication protocol server. In other words, the deployable wireless communications network 100 is configured to authenticate the wireless communications device 105 according to the extensible authentication protocol. In some embodiments, the deployable wireless communications network 100 is configured to authenticate the wireless communications device 105 according to a different authentication protocol as mentioned previously herein. In such embodiments, the mobile management entity 130 and the deployable authentication database 125 are modified to receive and compare different security credentials corresponding to the different authentication protocol.

Once the wireless communications device 105 is authenticated using extensible authentication protocol, at block 415, the mobile management entity 130 establishes a first wireless connection between the wireless communications device 105 and the deployable subscription bootstrapping service 120. In other words, in some embodiments, the mobile management entity 130 forwards network packets from the wireless communications device 105 to the deployable subscription bootstrapping service 120 and vice versa through the network node 145. In some embodiments, the mobile management entity 130 only allows the wireless communications device 105 to communicate with the deployable subscription bootstrapping service 120 over the first wireless connection. In other words, the mobile management entity 130 prevents the wireless communications device 105 from accessing other components and services of the network 100 (for example, the applications 135a and 135n) over the first wireless connection.

In alternate embodiments, the mobile management entity 130 communicates connection information (for example, an access point name) to the packet/serving gateway 140 as described previously herein and the packet/serving gateway establishes the first wireless connection based on the connection information from the mobile management entity 130. In some embodiments, the packet/serving gateway 140 establishes the first wireless connection in response to a request from the wireless communications device 105. In other embodiments, the packet/serving gateway 140 establishes the first wireless connection in response to receiving the connection information of the wireless communications device 105 from the mobile management entity 130. In some embodiments, the packet/serving gateway 140 only allows the wireless communications device 105 to communicate with the deployable subscription bootstrapping service 120 over the first wireless connection. In other words, the packet/serving gateway 140 prevents the wireless communications device 105 from accessing other components and services of the network 100 (for example, the applications 135a and 135n) over the first wireless connection.

At block 420, the deployable subscription bootstrapping service 120 determines a shared symmetric key based on the extensible authentication protocol packet from the wireless communications device 105. In other words, the deployable subscription bootstrapping service 120 may derive a shared symmetric key for the wireless communications device 105 based on the extensible authentication protocol master secret key of the wireless communications device 105. For example, the deployable subscription bootstrapping service 120 may derive a key access security management entries (KASME) key for the wireless communications device 105. In some embodiments, the derived key access security management entries key is a second key access security management entries key for the wireless communications device 105 (for example, because the corresponding key of the first key access security management entries in the remotely-located home subscriber server cannot be accessed). The shared symmetric key is unique to the wireless communications device 105 and the deployable wireless communications network 100.

In some embodiments, based on the derived key access security management entries key, the deployable subscription bootstrapping service 120 derives other Long Term Evolution authentication keys for the wireless communications device 105 (for example, master base key (Ki), cipher key (CK), integrity key (IK), e Node B base key (KeNB), and the like). In some embodiments, the deployable subscription bootstrapping service 120 may derive a different authentication key (for example, the master base key (Ki)) for the wireless communications device 105 based on the extensible authentication protocol master secret key of the wireless communications device 105. In such embodiments, the other Long Term Evolution authentication keys (for example, the key access security management entries key) may be derived based on the derived master base key.

After deriving the shared symmetric key, at block 425, the deployable subscription bootstrapping service 120 generates a subscription profile (for example, a Long Term Evolution subscription profile) for the wireless communications device 105 including the shared symmetric key. As described previously herein, the subscription profile includes credentials, parameters, and settings that the wireless communications device 105 uses to establish a connection with the network 100 (for example, the public land mobile network identification, the access point name, an international subscriber module identity, operator authentication keys, and other network parameters). In some embodiments, at least some of these credentials, parameters, and settings are based on attributes established by the extensible authentication protocol master secret key received from the wireless communications device 105 (at block 405). In some embodiments, the subscription profile generated by the deployable subscription bootstrapping service 120 generates at least one of a universal mobile telecommunications system (UMTS) subscriber identity module (USIM) profile, an internet protocol (IP) multimedia subsystem (IMS) subscriber identity module (ISIM) profile, and a mission critical push-to-talk (MCPTT) profile. In some embodiments, the internet protocol multimedia subsystem subscriber identity module profile includes a generated internet protocol multimedia private identity (IMPI) and a generated internet protocol multimedia public identity (IMPU). In some embodiments, the mission critical push-to-talk profile includes a mission critical push-to-talk identification that is associated with the created generated internet protocol multimedia public identity.

At block 430, the deployable subscription bootstrapping service 120 communicates the subscription profile to the wireless communications device 105 via the first wireless connection. In some embodiments, the deployable subscription bootstrapping client on the wireless communications device 105 stores the subscription profile, for example, in the first memory 210 or on the universal integrated circuit card 235. For example, in some embodiments, the universal integrated circuit card 235 stores at least one of a second universal mobile telecommunications system subscriber identity module profile, a second internet protocol multimedia subsystem subscriber identity module profile, and a second mission critical push-to-talk profile in addition to similar profiles already stored on the universal integrated circuit card 235. In some embodiments, the deployable subscription bootstrapping service 120 also transmits the subscription profile of the wireless communications device 105 to the deployable authentication database 125 to be stored. The deployable subscription bootstrapping service 120 also provisions services, on the deployable wireless communications network 100, for the newly-created subscription profile. For example, such services may include internet protocol (IP) multimedia subsystem (IMS), voice over IP (VoIP), mission critical push-to-talk (MCPTT), location, presence, or other services.

Once the wireless communications device 105 receives the subscription profile from the deployable subscription bootstrapping service 120, at block 435, the wireless communications device 105 or the network 100 discontinues the first connection. For example, in some embodiments, the deployable subscription bootstrapping client on the wireless communications device 105 controls the first electronic processor 205 to disconnect the wireless communications device 105 from the base station 110. In other embodiments, the deployable subscription bootstrapping service 120 instructs the mobile management entity 130 to discontinue the forwarding of network packets to and from the wireless communications device 105.

At block 440, the packet/serving gateway 140 establishes a second wireless connection between the wireless communications device 105 and the deployable wireless communications network 100 using the subscription profile. For example, the wireless communications device 105 initiates authentication with the deployable wireless communications network 100 using the authentication data from the subscription profile stored in the first memory 210 or the universal integrated circuit card 235 (at block 430). For example, the subscription profile may include a universal mobile telecommunications system subscriber identity module profile to authenticate the wireless communications device 105 according to the Long Term Evolution specification. The authentication data includes data used to enable the wireless communications device 105 to authenticate itself to the mobile management entity 130 of the deployable wireless communications network 100, including the shared symmetric key generated by the deployable subscription bootstrapping service 120 (at block 425). The mobile management entity 130 receives the subscription profile from the wireless communications device 105 through the base station 110. The mobile management entity 130 then authenticates the wireless communications device 105 by comparing the authentication data in the received subscription profile to authentication data in subscription profiles stored in the deployable authentication database 125.

Because the deployable subscription bootstrapping service 120 has previously stored a matching subscription profile in the deployable authentication database 125, the mobile management entity 130 authenticates the wireless communications device 105 according to the Long Term Evolution specification using the received subscription profile. For example, the deployable authentication database 125 generates authentication vectors for the wireless communications device 105 using an authentication and key agreement (AKA) algorithm. The mobile management entity 130 challenges the wireless communications device 105 with the vectors. The wireless communications device 105 runs the authentication and key agreement algorithm, and returns a response, based on the shared symmetric key, to the mobile management entity 130. The wireless communications device 105 then establishes a security association (SA) with the base station 110 and the mobile management entity 130.

The mobile management entity 130 then communicates second connection information (for example, an access point name) to the packet/serving gateway 140 as described previously herein. The wireless communications device 105 attaches to the access point of the deployable wireless communications network 100 and is connected to the packet/serving gateway 140. At this point, the wireless communications device 105 may use the deployable wireless communications network 100 as it would normally use a Long Term Evolution network, and access the services provided by the applications 135a, 135n, based on the generated subscription profile for the wireless communications device 105. Services, other than access to the Long Term Evolution network, for example, internet protocol multimedia subsystem, voice over internet protocol, push-to-talk, location, presence, or other services, may utilize information provided during the subscription bootstrapping process to enable clients on the wireless communications device 105 to connect with their respective services within the deployable wireless communications network 100. For example, the wireless communications device 105 may register for internet protocol multimedia subsystem access using the generated internet protocol multimedia subsystem subscriber identity module profile. The wireless communications device 105 may also register for mission critical push-to-talk access using the generated mission critical push-to-talk profile. In other words, because the wireless communications device 105 was authenticated using the generated Long Term Evolution subscription profile, the mobile management entity 130 may assign the wireless communications device 105 an access point name that allows the wireless communications device 105 to access more components of the network 100 than merely the deployable subscription bootstrapping service 120. In some embodiments, when authenticated using the subscription profile according to the Long Term Evolution specification, the wireless communications device 105 may be able to access all components of the network 100

In some embodiments, the packet/serving gateway 140 establishes the second wireless connection in response to a request from the wireless communications device 105. For example, the deployable subscription bootstrapping client of the wireless communications device 105 may control the first electronic processor 205 to reconnect to the network 100 once the first wireless connection is discontinued. In other embodiments, the packet/serving gateway 140 establishes the second wireless connection once the first wireless connection is discontinued (or a predetermined time period after the first wireless connection is discontinued).

In some embodiments, when the deployable wireless communications network 100 is able to connect to network infrastructure (for example, to access remotely-located home subscriber servers), the network 100 may retain the subscription profiles including the shared symmetric keys generated by the deployable subscription bootstrapping service 120 in the deployable authentication database 125. For example, retaining these subscription profiles may allow these subscription profiles to be used again when the deployable wireless communications network 100 is no longer able to connect to the network infrastructure.

Similarly, in embodiments where a non-deployable network loses connectivity to network infrastructure and begins operating as a deployable wireless communications network 100, when the non-deployable network re-establishes a connection with the network infrastructure, the non-deployable network may retain subscription profiles including the shared symmetric keys generated by the deployable subscription bootstrapping service 120 stored in the deployable authentication database 125. For example, retaining these subscription profiles may allow these subscription profiles to be used again in the event that the non-deployable network loses connectivity to the network infrastructure again in the future.

Although the method 400 describes the deployable subscription bootstrapping service 120 as generating the shared symmetric key and subscription profile of the wireless communications device 105 (at blocks 420 and 425), in some embodiments, the deployable subscription bootstrapping client on the wireless communications device 105 may perform these functions. In such embodiments, the wireless communications device 105 communicates the generated shared symmetric key and subscription profile to the deployable subscription bootstrapping service 120 to be transmitted and stored in the deployable authentication database 125. In some embodiments, the deployable subscription bootstrapping service 120 and the deployable subscription bootstrapping client on the wireless communications device 105 work in combination to generate the shared symmetric key and subscription profile of the wireless communications device 105.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for connecting a wireless communications device to a deployable wireless communications network, the deployable wireless communications network including a local authentication database, the method comprising:

receiving, from the wireless communications device via a mobile management entity (MME) configured to operate as an extensible authentication protocol (EAP) authenticator, an extensible authentication protocol packet;

authenticating, via a communication between the mobile management entity and the local authentication database, the wireless communications device based on the extensible authentication protocol packet;

establishing a first wireless connection between the wireless communications device and a deployable subscription bootstrapping service of the deployable wireless communications network;

determining, via the deployable subscription bootstrapping service, a shared symmetric key based on the extensible authentication protocol packet;

generating, via the deployable subscription bootstrapping service, a subscription profile including the shared symmetric key;

communicating, via the deployable subscription bootstrapping service, the subscription profile to the wireless communications device via the first wireless connection;

discontinuing the first wireless connection; and establishing a second wireless connection between the wireless communications device and the deployable wireless communications network using the subscription profile.

2. The method of claim 1 further comprising communicating, via the deployable subscription bootstrapping service, the subscription profile to the local authentication database.

3. The method of claim 1, wherein determining the shared symmetric key based on the extensible authentication protocol packet includes deriving, via the deployable subscription bootstrapping service, a key access security management entries (KASME) key based on an extensible authentication protocol master secret key.

4. The method of claim 3 further comprising deriving at least one other Long Term Evolution authentication key based on the key access security management entries key.

5. The method of claim 1, wherein generating, via the deployable subscription bootstrapping service, the subscription profile including the shared symmetric key includes generating at least one of the group consisting of a universal mobile telecommunications system (UMTS) subscriber identity module (USIM) profile, an internet protocol (IP) multimedia subsystem (IMS) subscriber identity module (ISIM) profile, and a mission critical push-to-talk (MCPTT) profile.

6. The method of claim 1, further comprising:
connecting, via the deployable wireless communications network, to a network infrastructure; and
retaining, in the local authentication database, the subscription profile including the shared symmetric key.

7. The method of claim 1, further comprising communicating, via the deployable wireless communications network to the wireless communications device, that the deployable wireless communications network is available before establishing the first wireless connection between the wireless communications device and the deployable subscription bootstrapping service of the deployable wireless communications network.

8. A deployable wireless communications network comprising:
a base station configured to communicate with a wireless communications device;
a mobile management entity (MME) configured to operate as an extensible authentication protocol (EAP) authenticator, wherein the mobile management entity receives an extensible authentication protocol packet from the wireless communications device;
a local authentication database configured to communicate with the mobile management entity to authenticate the wireless communications device based on the extensible authentication protocol packet; and
a deployable subscription bootstrapping service configured to
communicate with the wireless communications device over a first wireless connection,
determine a shared symmetric key based on the extensible authentication protocol packet,
generate a subscription profile including the shared symmetric key, and
communicate the subscription profile to the wireless communications device via the first wireless connection;
wherein the deployable wireless communications network discontinues the first wireless connection and establishes a second wireless connection between the wireless communications device and the deployable wireless communications network using the subscription profile.

9. The deployable wireless communications network of claim 8, wherein the deployable subscription bootstrapping service communicates the subscription profile to the local authentication database.

10. The deployable wireless communications network of claim 8, wherein the deployable subscription bootstrapping service derives a key access security management entries (KASME) key based on an extensible authentication protocol master secret key from the extensible authentication protocol packet.

11. The deployable wireless communications network of claim 10, wherein the deployable subscription bootstrapping service derives at least one other Long Term Evolution authentication key based on the key access security management entries key.

12. The deployable wireless communications network of claim 8, wherein the subscription profile includes at least one of the group consisting of a universal mobile telecommunications system (UMTS) subscriber identity module (USIM) profile, an internet protocol (IP) multimedia subsystem (IMS) subscriber identity module (ISIM) profile, and a mission critical push-to-talk (MCPTT) profile.

13. The deployable wireless communications network of claim 8, wherein the deployable wireless communications network connects to a network infrastructure and the local authentication database retains the subscription profile including the shared symmetric key.

14. The deployable wireless communications network of claim 8, wherein the deployable wireless communications network communicates to the wireless communications device that the deployable wireless communications network is available before the first wireless connection between the wireless communications device and the deployable subscription bootstrapping service is established.

* * * * *